(12) United States Patent
Boyapalle et al.

(10) Patent No.: US 11,950,140 B2
(45) Date of Patent: Apr. 2, 2024

(54) SYSTEM AND METHOD FOR PROVIDING DEVICE MANAGEMENT AND NETWORK MANAGEMENT AT AN EDGE DEVICE

(71) Applicant: Dell Products, LP, Round Rock, TX (US)

(72) Inventors: Anantha K. Boyapalle, Cedar Park, TX (US); Liam B. Quinn, Austin, TX (US)

(73) Assignee: Dell Products LP, Round Rock, TX (US)

( * ) Notice: Subject to any disclaimer, the term of this patent is extended or adjusted under 35 U.S.C. 154(b) by 124 days.

(21) Appl. No.: 17/509,497

(22) Filed: Oct. 25, 2021

(65) Prior Publication Data

US 2023/0130774 A1    Apr. 27, 2023

(51) Int. Cl.
| | |
|---|---|
| *H04W 28/20* | (2009.01) |
| *H04L 41/0896* | (2022.01) |
| *H04W 24/08* | (2009.01) |
| *H04W 24/10* | (2009.01) |
| *H04W 28/02* | (2009.01) |
| *H04W 40/02* | (2009.01) |

(52) U.S. Cl.
CPC ......... *H04W 28/20* (2013.01); *H04L 41/0896* (2013.01); *H04W 24/08* (2013.01); *H04W 24/10* (2013.01); *H04W 28/0247* (2013.01); *H04W 28/0268* (2013.01); *H04W 40/02* (2013.01)

(58) Field of Classification Search
None
See application file for complete search history.

(56) References Cited

U.S. PATENT DOCUMENTS

| | | |
|---|---|---|
| 6,459,682 B1 | 10/2002 | Elleesson |
| 7,920,472 B2 | 4/2011 | Porat |
| 7,924,713 B2 | 4/2011 | Porat |
| 8,199,670 B2 | 6/2012 | Mishra |
| 8,787,159 B2 | 7/2014 | Barclay |

(Continued)

FOREIGN PATENT DOCUMENTS

| | | | |
|---|---|---|---|
| CN | 1882182 | * | 12/2006 |
| KR | 20120041196 | * | 10/2012 |
| WO | WO2012083634 | * | 6/2012 |

*Primary Examiner* — Andre Tacdiran
(74) *Attorney, Agent, or Firm* — Prol Intellectual Property Law, PLLC; H Kenneth Prol

(57) ABSTRACT

An edge device is disclosed and includes a processor, a memory, and a power management unit (PMU). The processor executes code instructions of an edge throughput services management system for managing a wireless network and one or more devices operatively coupled to the wireless network and the edge device. The processor detects a number of managed client information handling systems operatively coupled to the edge device; creates a persona associated with each of the managed client information handling systems; conducts an inventory of one or more applications requiring network access associated within each persona; prioritizes each persona for network access; and prioritizes each application associated with each persona for network access. The edge throughput services management system to provide a service for monitoring and recommending adjustments to the wireless network and managed client information handling systems for flexible data bandwidth access to the wireless network.

20 Claims, 9 Drawing Sheets

(56) References Cited

U.S. PATENT DOCUMENTS

| | | | |
|---|---|---|---|
| 9,813,447 B2 | 11/2017 | Rash | |
| 10,212,224 B2 | 2/2019 | Kjendal | |
| 10,560,314 B2 | 2/2020 | Ramachandran | |
| 10,735,511 B2 | 8/2020 | Kjendal | |
| 10,805,235 B2 | 10/2020 | Kulkarni | |
| 11,336,585 B1* | 5/2022 | Wang | H04L 47/83 |
| 2002/0023170 A1 | 2/2002 | Seaman | |
| 2004/0196788 A1 | 10/2004 | Lodha | |
| 2006/0245356 A1 | 11/2006 | Porat | |
| 2013/0107718 A1* | 5/2013 | Edara | H04W 28/0268 370/236 |
| 2015/0142962 A1* | 5/2015 | Srinivas | H04L 41/0895 709/224 |
| 2016/0021005 A1* | 1/2016 | Kiyose | H04L 45/66 370/401 |
| 2018/0165579 A1* | 6/2018 | Friel | G06N 3/044 |
| 2018/0357109 A1* | 12/2018 | Mithal | G06F 9/5077 |
| 2021/0075697 A1 | 3/2021 | Dattagupta | |
| 2022/0417571 A1* | 12/2022 | Fruchter | H04N 21/23655 |
| 2022/0417794 A1* | 12/2022 | Bogineni | H04W 28/0967 |
| 2023/0080872 A1* | 3/2023 | Jeuk | H04L 41/0654 709/221 |

\* cited by examiner

SYSTEM AND METHOD FOR PROVIDING DEVICE MANAGEMENT AND NETWORK MANAGEMENT AT AN EDGE DEVICE

FIELD OF THE DISCLOSURE

The present disclosure generally relates to an edge device in a network. More particularly, the present disclosure relates to providing device management and network management at an edge device.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. As data usage by information handling systems increases, managing the networks on which the information handling systems operate becomes increasingly important.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

With the increase of smart devices and ubiquity of information handling systems, network management has become increasingly important. In an office setting or a home setting there may be any number of devices operatively coupled to a network. Each device will consume a portion of the available data bandwidth and eventually, bottlenecks may occur or one or more devices will be unable to utilize network data bandwidth due to a lack of availability. For example, a family of four with two working parents and two teenage children may have eight information handling systems (e.g., four computers and four mobile telephones) and four smart devices (e.g., smart televisions). Further, there may be networked security cameras, networked speakers, and any other number of other devices operatively coupled to the network. During operation, these devices may be fighting for network resources and at times, some may not have access to network resources.

The systems and methods disclosed herein may allow an edge device to execute code instructions of an edge throughput services management system to manage a plurality of information handling systems, smart devices, and other network enabled devices coupled to the edge device. The edge device may set priority for the information handling systems, smart devices, and other network enabled devices. As such, in an embodiment, the information handling systems, smart devices, and other network enable devices will be given access to network resources based on the hierarchy set forth in the priorities. The edge device may also set priority for the applications operating on the information handling systems, smart devices, and other network enabled devices. These applications will be given access to network resources based on the priority hierarchy thereof. The systems and methods herein may also allow an edge device to monitor the total data bandwidth in use and make service plan recommendations based on the total data bandwidth in use. Further, the edge device may monitor historical network resource usages and use the historical data to predict future issues and make network changes to avoid those predicted future issues. Accordingly, network issues may be substantially minimized or solvable with customer access to edge device adjustments.

Figure 1:
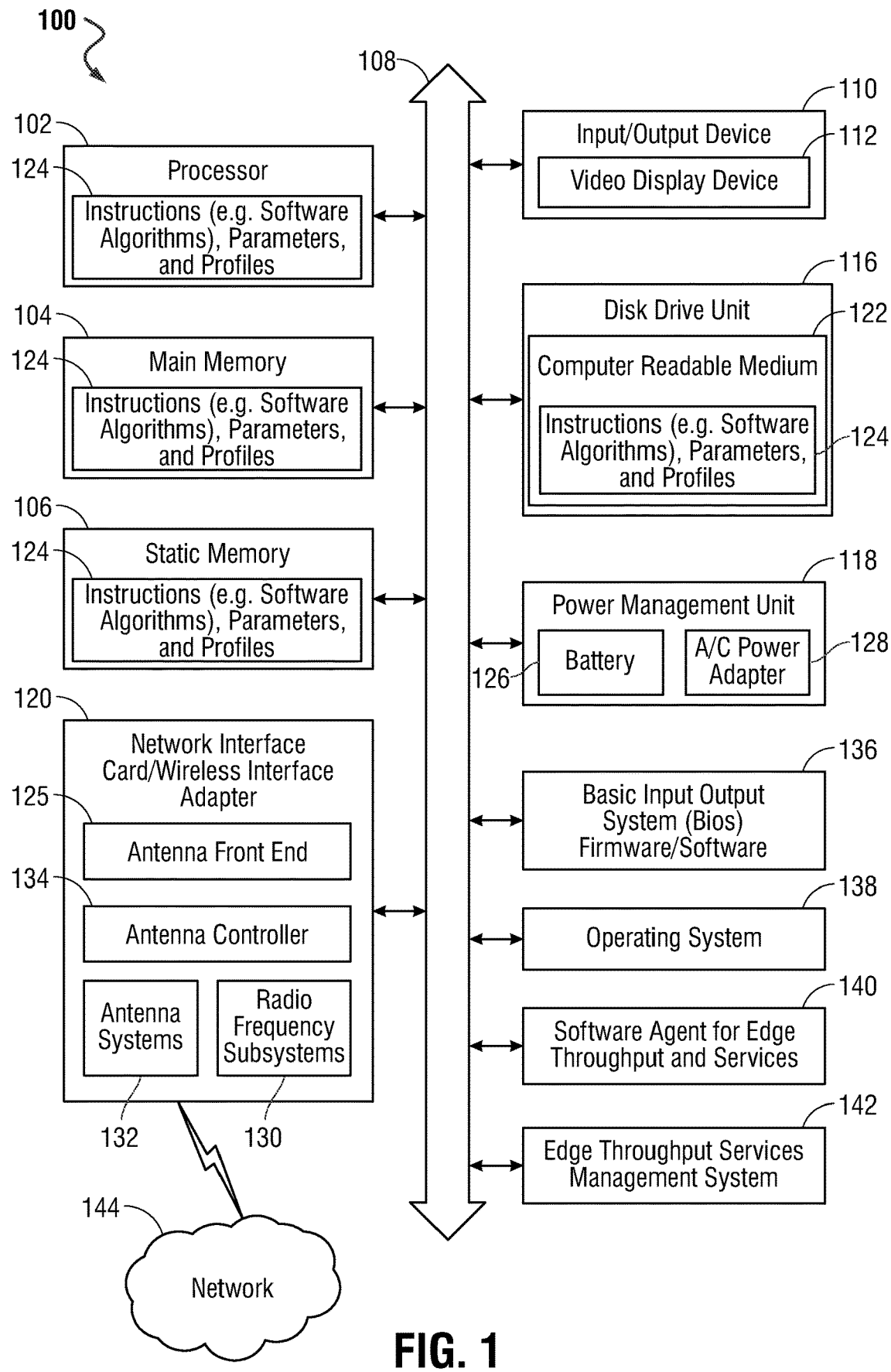
FIG. 1 is a block diagram illustrating an information handling system according to an embodiment of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic information handling systems that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions. In a specific embodiment, the information handling system 100 may be an edge device executing instructions or performing methods according to the present disclosure.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of an edge throughput services management system 142 or an endpoint client device software agent for edge throughput 144, and drive unit 116 (volatile (e.g., random-access memory, etc.), non-volatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device 112, such as a keyboard, and/or a cursor control device, such as a mouse, touchpad, or gesture or touch screen input device. The information handling system 100 can also include a disk drive unit 116.

The network interface device shown as network interface card/wireless interface adapter 120 can provide connectivity to a network 144, e.g., a wide area network (WAN), a local area network (LAN), wireless local area network (WLAN), a wireless personal area network (WPAN), a wireless wide area network (WWAN), or another network. In an embodiment, the WAN, WWAN, LAN, and WLAN may each include an access point used to operatively coupled the information handling system 100 to a network. In a specific embodiment, the network 144 may include macro-cellular connections via one or more base stations 162 or a wireless access points 160 (e.g., Wi-Fi or WiGig), or such as through licensed or unlicensed WWAN small cell base stations.

Connectivity may be via wired or wireless connection. The network interface card/wireless interface adapter 120, in an embodiment, may include one or more radio frequency subsystems 130 with transmitter/receiver circuitry, modem circuitry, one or more radio frequency front end circuits, one or more wireless controller circuits, amplifiers, antenna systems 132 and other circuitry of the radio frequency subsystem 130 such as one or more antenna ports used for wireless communications via multiple radio access technologies. Each radio frequency subsystem 130 may communicate with one or more wireless technology protocols. The radiofrequency subsystem 130 may contain individual subscriber identity module (SIM) profiles for each technology service provider and their available protocols for any operating subscriber-based radio access technologies such as cellular LTE communications.

The network interface card/wireless interface adapter 120 may also include antenna systems 132 which may include any number of tunable antenna systems for use with the system and methods disclosed herein. Additional antenna system modification circuitry (not shown) may also be included with the network interface card/wireless interface adapter 120 to implement coexistence control measures via an antenna controller 134 as described in various embodiments of the present disclosure.

In some aspects of the present disclosure, the network interface card/wireless interface adapter 120 may operate two or more wireless links. In a further aspect, the network interface card/wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands.

The network interface card/wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, or similar wireless standards may be used. Network interface card/wireless interface adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 144 may be based on the radio access network (RAN) standards that implement, for example, eNodeB or gNodeB hardware connected to mobile phone networks (e.g., cellular networks) used to communicate with the information handling system 100. In the example embodiment, mobile device 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end of the information handling system 100 may operate on a licensed WWAN wireless radio with authorization for subscriber access to a wireless service provider on a carrier licensed frequency band.

The network interface card/wireless interface adapter 120 can represent an add-in card, wireless network interface module that is integrated with a main board of the information handling system or integrated with another wireless network interface capability, or any combination thereof. In an embodiment the network interface card/wireless interface adapter 120 may include one or more radio frequency subsystems 130 including transmitters and wireless controllers for connecting via a multitude of wireless links. In an example embodiment, an information handling system may have an antenna system transmitter for 5G small cell WWAN, Wi-Fi WLAN or WiGig connectivity and one or more additional antenna system transmitters for macro-cellular communication. The radio frequency subsystems 130 include wireless controllers to manage authentication, connectivity, communications, power levels for transmission, buffering, error correction, baseband processing, and other functions of the network interface card/wireless interface adapter 120.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a network interface card/wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

In an embodiment of FIG. 1, the information handling system 100 may be an edge device or one or more edge devices such as one or more servers located at or adjacent to a core. As shown in another embodiment of FIG. 1, the information handling system 100 may further be a client endpoint mobile device and may include an embedded software agent for edge device throughput and services 140. The software agent for edge device throughput and services 140 may be pushed to the client information handling system 100 by an edge device and the software agent for edge device throughput and services 140 may provide an interface at the client information handling system 100 to assist in managing a network and various devices operatively coupled thereto.

In an embodiment, the information handling system 100 may connect to an external wireless network 144. In particular, the wireless network 144 may have a wireless mesh architecture in accordance with mesh networks described by the wireless data communications standards or similar standards in some embodiments but not necessarily in all embodiments. The network interface card/wireless interface adapter 120 may connect to the external wireless network 144 via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware information handling systems can be constructed to implement one or more of the methods described herein. Applications that may include the apparatus and systems of various embodiments can broadly include a variety of electronic and computer systems. One or more embodiments described herein may implement functions using two or more specific interconnected hardware modules or information handling systems with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 144 can communicate voice, video or data over the wireless network 144. Further, the instructions 124 may be transmitted or received over the wireless network 144 via the network interface device, i.e., the network interface card/wireless interface adapter 120.

The network interface card/wireless interface adapter 120 may be disposed within the information handling system 100, on a main circuit board of the information handling system, integrated onto another component such as processor 102, in another suitable location, or a combination thereof. The network interface card/wireless interface adapter 120 can include another information handling system, a data storage system, another network, a grid management system, another suitable resource, or a combination thereof. In an embodiment, the network interface card/wireless interface adapter 120 may operably connect to the network 144. The connection to network 144 may be wired or wireless.

The network interface device shown as network interface card/wireless interface adapter 120 can provide connectivity to the network 144, such as a wide area network (WAN), a local area network (LAN), wireless local area network (WLAN), a wireless personal area network (WPAN), a wireless wide area network (WWAN), or another network. Connectivity may be via wired or wireless connection. The network interface card/wireless interface adapter 120 may include an adaptive massive MIMO Multiplexer with transmitter/receiver circuitry, wireless controller circuitry, amplifiers and other circuitry for wireless communications. The network interface card/wireless interface adapter 120 may also include antenna systems 132 as described above which may be tunable antenna systems for use with the system and methods disclosed in the embodiments herein. The antenna controller 134 may also include wireless controllers to manage authentication, connectivity, communications, power levels for transmission, buffering, error correction, baseband processing, and other functions of the network interface card/wireless interface adapter 120.

The information handling system 100 can include a set of instructions 124 that can be executed to cause the computer system to perform any one or more of the methods or computer-based functions disclosed herein. For example, instructions 124 may execute an edge throughput services management system 140 on an edge device, a software agent for edge throughput and services, various software applications, other software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 134 to perform the processes described herein. Similarly, main memory 104 and static memory 106 may also contain a computer-readable medium for storage of one or more sets of instructions, parameters, or profiles 124. The disk drive unit 116 or static memory 106 also contain space for data storage. Further, the instructions 124 may embody one or more of the methods or logic as described herein. In a particular embodiment, the instructions, parameters, and profiles 124 may reside completely, or at least partially, within the main memory 104, the static memory 106, and/or within the disk drive 116 during execution by the processor 102 or an antenna controller 134 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such devices, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
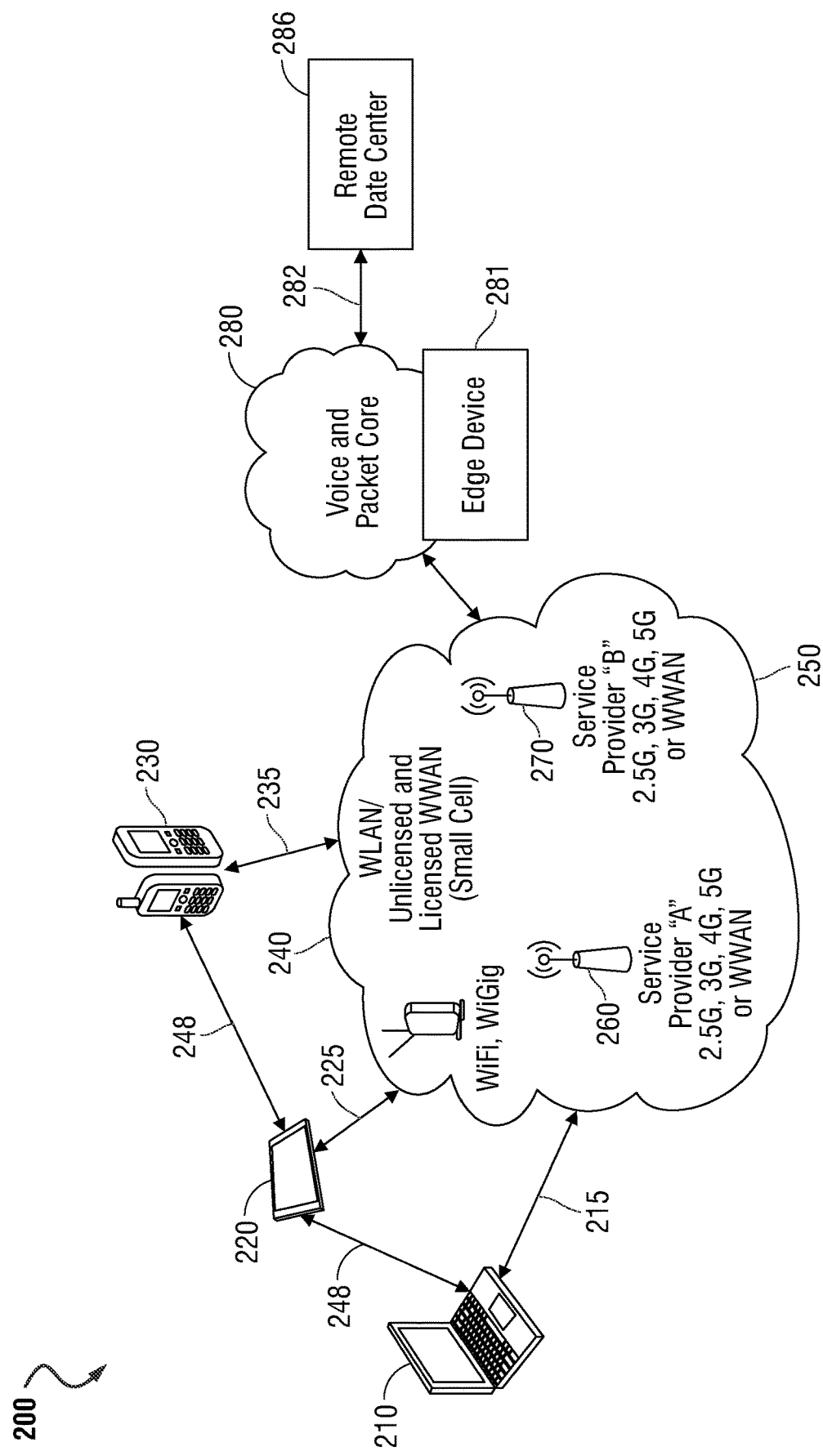
FIG. 2 is a block diagram of a network environment offering several communication protocol options and mobile information handling systems according to an embodiment of the present disclosure.

FIG. 2 illustrates a network 200 that can include one or more information handling systems 210, 220, 230. The information handling systems 210, 220, 230 shown in FIG. 2 may be endpoint mobile devices similar to one embodiment of the information handling system 100 described in connection with FIG. 1. In a particular embodiment, network 200 includes networked mobile devices 210, 220, and 230, wireless network access points, and multiple wireless connection link options. A variety of additional computing resources of network 200 may include client mobile devices, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile devices 210, 220, and 230, may access a wireless local network 240, or they may access a macro-cellular network 250. For example, the wireless local network 240 may be available through an access point 245 and may operate a wireless local area network (WLAN), a wireless personal area network (WPAN), or a wireless wide area network (WWAN). The access point 245 may be a WLAN access point for Wi-Fi communications in an embodiment. In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points 245 or base stations 260, 270 may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service provider base stations 260 and 270. As described herein, a plurality of antennas may be operatively coupled to any of the macro-cellular connections 250 via one or more service providers or to the wireless local area networks (WLANs) selectively based on the SAR data, RSSI data, configuration data, system operation and connection metrics, and antenna mounting locations (e.g., spatial locations within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or 5G standards including WiMAX, LTE, and LTE Advanced, LTE-LAA, small cell WWAN, and future standards such as the emerging 6G standards.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. Each of these frequencies used to communicate over the network 240 or 250 may be based on the radio access network (RAN) standards that implement, for example, eNodeB or gNodeB hardware connected to mobile phone networks (e.g., cellular networks) used to communicate with the information handling system 100. In the example embodiment, any mobile device 210, 220, 230 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 210, 220, 230 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile device 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile device 210, 220 or 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein.

The network 200 may further include an edge device 281 at the voice and packet core 280 or adjacent to the voice and packet core 280. In an embodiment, the edge device 281 may include an edge server that may execute the code instructions of edge throughput services management system 142 in order to manage throughput, security, virtual private networks, etc. Further, the edge device 281 may execute the code instructions of edge throughput services management system 142 in order to offer software services to managed endpoints, e.g., managed information handling systems operatively coupled to the edge device 281. The edge device 281 may further execute the code instructions of edge throughput services management system 142 in order to provide flexible data bandwidth consumption with edge controls to manage customer end points to cloud/edge services with just a few simple clicks of a mouse. The edge device 281 may be managed by a service provider and operated by a customer and is designed to reduce overall costs and improve services.

The voice and packet core network 280 shown in FIG. 2 may contain externally accessible computing resources and connect to a remote data center 286. The voice and packet core network 280 may contain multiple intermediate web servers or other locations with accessible data (not shown) and may comprise a 5G Core, 4G evolved packet core (EPC), or other core network in support of a RAN protocol. The voice and packet core network 280 may also connect to other wireless networks similar to 240 or 250 and additional mobile devices such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile device or may connect directly to one or more mobile devices 210, 220, and 230. Alternatively, mobile devices 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile devices 210, 220, and 230 allowing streamlining and efficiency within those devices. Similarly, remote data center permits fewer resources to be maintained in other parts of network 200.

In a particular aspect, the remote data center 286 may include an authentication server. The authentication server may authenticate information handling systems, e.g., a trusted and authenticated information handling system, based on local credentials that may be stored at the trusted and authenticated information handling system and transmitted to the remote data center 286. The remote data center 286 may also include a SIM profile provisioning server. The SIM profile provisioning server may be used to distribute SIM profiles, e.g., eSIMS, to new information handling systems as these new information handling system are brought online for the first time.

Although 215, 225, and 235 are shown connecting wireless adapters of mobile devices 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile devices 210, 220, and 230 may communicate intra-device via 248 when one or more of the mobile devices 210, 220, and 230 are set to act as an access point or even potentially an WWAN connection via small cell communication on licensed or unlicensed WWAN connections. For example, one of mobile devices 210, 220, and 230 may serve as a Wi-Fi hotspot in an embodiment. Concurrent wireless links to information handling systems 210, 220, and 230 may be connected via any access points including other mobile devices as illustrated in FIG. 2.

Figure 3:
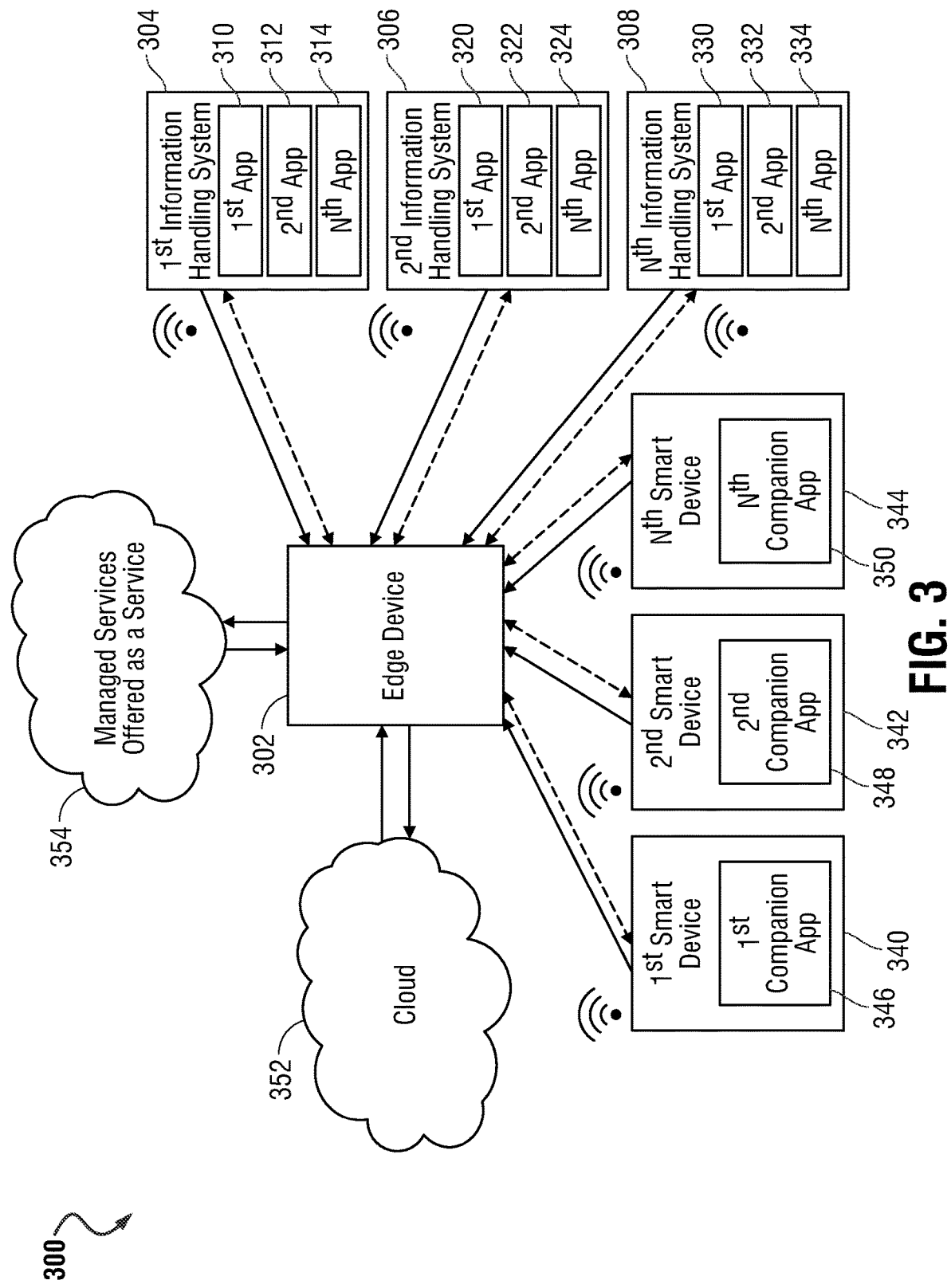
FIG. 3 is a block diagram of a network system with an edge device according to an embodiment of the present disclosure.

Referring now to FIG. 3, a network system according to an embodiment of the present disclosure is illustrated and is generally designated 300. It is to be understood that the network system 300 may be a home network system, an office network system, a motor vehicle network system, a nautical vehicle network system, an aerial vehicle network system, a space vehicle network system, or a combination thereof. As shown, the network system 300 may include an edge device 302. In an embodiment, the edge device 302 may be a device that serves as an entry point into an enterprise network, a service provider core network, or a combination thereof. In particular, the edge device 302 may be a router, a routing switch, an integrated access devices (IAD), a multiplexer, a metropolitan area network (MAN) device, a wide area network (WAN) access device, or a combination thereof. The edge device 302 may also provide a connection into a carrier network, a service provider network, or a combination thereof. In a particular embodiment, the edge device 302 may be a router that provides authenticated access, for example, point-to-point over asynchronous transfer mode (PPPoA) and point-to-point protocol over ethernet (PPPoE), to faster, more efficient backbone and core networks.

As illustrated in FIG. 3, the network system 300 may include a first information handling system 304 operatively coupled to the edge device 302. In an embodiment, a second information handling system 306 may be operatively coupled to the edge device 302. Moreover, a third information handling system 308 may be operatively coupled to the edge device 302. In an embodiment, the information handling systems 304, 306, 308 may include any combination of the following devices: a personal computer, mobile device (e.g., personal digital assistant (PDA) or smart phone), server (e.g., blade server or rack server), a consumer electronic information handling system, a network server or storage device, a network router, switch, or bridge, wireless router, or other network communication information handling system, a network connected device (cellular telephone, tablet information handling system, etc.), IoT computing device, wearable computing device, a set-top box (STB), a mobile device, a palmtop computer, a laptop computer, a desktop computer, a communications device, an access point (AP), a base station transceiver, a wireless telephone, a control system, a camera system, a scanner, a printer, a personal device, a web appliance, or any other suitable machine capable of executing a set of instructions (sequential or otherwise) that specify actions to be taken by that machine, and can vary in size, shape, performance, price, and functionality.

In an embodiment, and as illustrated in FIG. 3, the first information handling system 304 of the network system 300 may include a first application 310, a second application 312, and an Nth application 314. For example, the application 310, 312, 314 within the first information handling system 304 may include antivirus programs, audio players, chat software, communication software, database management programs, email programs, games, HTML editing software, Internet browsers, messaging software, photo editing software, presentation software, programming language, simulators, spreadsheet programs, video editing software, video players, and word processing software. Many of these applications require access to a network in order to operate. For example, one or more applications 310, 312, 314 may execute in whole or in part at a remote location at the edge device 302 or in the cloud 354 or the world wide web 352. Further, when many of these applications are operating across different information handling system 304, 306, 308, network data bandwidth may be quickly consumed. The systems and methods described herein, may automatically set priority for the various applications or allow a user, or administrator, to define the priority for the various applications 310, 312, 314 within the first information handling system 304 or all applications across all information handling systems 304, 306, 308.

In an embodiment, the second information handling system 306 of the network system 300 may include a first application 320, a second application 322, and an Nth application 324. For example, the applications 320, 322, 324 within the second information handling system 306 may include antivirus programs, audio players, chat software, communication software, database management programs, email programs, games, HTML editing software, Internet browsers, messaging software, photo editing software, presentation software, programming language, simulators, spreadsheet programs, video editing software, video players, and word processing software. Many of these applications require access to a network in order to operate and may operate in whole or in part at a remote location at the edge device 302 or in the cloud 354 or the world wide web 352. Further, when many of these applications are operating across different information handling system 304, 306, 308, network data bandwidth may be quickly consumed. The systems and methods described herein, may automatically set priority for the various applications or allow a user, or administrator, to define the priority for the various applications 320, 322, 324 within the second information handling system 306 or all applications across all information handling systems 304, 306, 308.

Further still, in an embodiment, the third information handling system 308 of the network system 300 may include a first application 330, a second application 332, and an Nth application 334. For example, the application 330, 332, 334 within the first information handling system 304 may include antivirus programs, audio players, chat software, communication software, database management programs, email programs, games, HTML editing software, Internet browsers, messaging software, photo editing software, presentation software, programming language, simulators, spreadsheet programs, video editing software, video players, and word processing software. Many of these applications require access to a network in order to operate and may operate in whole or in part at a remote location at the edge device 302 or in the cloud 354 or the world wide web 352. Further, when many of these applications are operating across different information handling system 304, 306, 308, network data bandwidth may be quickly consumed. The systems and methods described herein, may automatically set priority for the various applications or allow a user, or administrator, to define the priority for the various applications 330, 332, 334 within the third information handling system 308 or all applications across all information handling systems 304, 306, 308. For example, a video chat application on an information handling system 304, 306, 308 that is being used to work from home may take priority over all of the remaining applications across all of the information handling systems 304, 306, 308.

FIG. 3 further indicates that in an embodiment, the network system 300 may include a first smart device 340 that is operatively coupled to the edge device 302. Further, in an embodiment, a second smart device 342 may be operatively coupled to the edge device 302. Moreover, a third smart device 344 may be operatively coupled to the edge device 302. In a particular embodiment, the smart devices 340, 342, 344 may include thin client devices that have network capabilities with limited computing abilities, but do not have the computing power of the information handling systems 304, 306, 308. For example, the smart devices 340, 342, 344 may include one or more smart televisions, one or more smart speakers, one or more smart displays, one or more smart light bulbs, one or more smart air purifiers, one or more smart refrigerators, one or more smart dish washers, one or more robot vacuums, one or more robot mowers, one or more robot mops, one or more smart air fryers, one or more smart lights, one or more smart light switches, one or more video doorbells, one or more smart pressure cookers, one or more smart ovens, one or more smart trash cans, one or more smart microwaves, one or more smart coffee makers, one or more indoor security cameras, one or more outdoor security cameras, one or more pet cameras, one or more smart baby monitors, one or more smart door locks, one or more smart garage door openers, one or more smart thermostats, one or more smart receptacles, one or more smart beds, one or more smart air conditioners, one or more smart scales, one or more smart shower controllers, one or more smart toilets, one or more smart tooth brushes, one or more smart watches, one or more smart stationary bikes, one or more smart stationary rowers, one or more smart tread mills, one or more smart stationary ski machines, one or more smart strength training machines, one or more smart sprinklers, one or more smart grills, one or more smart windows, one or more smart blinds, or a combination thereof.

As further illustrated in FIG. 3, in an embodiment, the first smart device 340 may include a first companion application 346. The second smart device 342 may also include a second companion application 348. Moreover, in an embodiment, the third smart device 344 may include a third companion application 350. In a particular embodiment, each companion application 346, 348, 350 may reside and execute on its respective smart device 340, 342, 344. In another embodiment, each companion application 348, 348, 350 may reside and execute on one or more of the information handling systems 304, 306, 308. In still another embodiment, each companion application 348, 350, 352 may reside and execute in part on its respective smart device 340, 342, 344 and in part on one or more of the information handling systems 304, 306, 308. In an embodiment, each companion application 348, 350, 352 may provide interactivity with its respective smart device 340, 342, 344. The companion application 348, 350, 352 may provide a direct link to its respective smart device 340, 342, 344 and may allow information collected by the smart device 340, 342, 344 to be presented to a user via the companion application 348, 350, 352. Moreover, the companion application 348, 350, 352 may provide an interface for controlling its respective smart device 340, 342, 344. Additionally, the companion application 348, 350, 352 may receive information regarding the operation of its respective smart device 340, 342, 344. For example, if a particular smart device 340, 342, 344 is a smart garage door opener, a companion application 348, 350, 352 for the smart garage door opener may reside on one or more of the information handling systems 304, 306, 308 and may allow a user to remotely open or close a garage door that is operatively coupled to the smart garage door opener via the press of a virtual button at the one or more information handling systems 304, 306, 308. Further, in this example, the companion application 348, 350, 352 for the smart garage door opener may alert a user if the garage door operatively coupled to the smart garage door opener is left open for a predetermined time period.

Still referring to FIG. 3, the edge device 302 may be operably coupled to the world wide web, aka, the Internet, 352. For example, the edge device 302 may be operably coupled to the world wide web 352 via a wireless connection, a wired connection, or a combination thereof. In an embodiment, the edge device 302 may also be operably coupled to managed services offered as a service 354. The edge device 302 may be operably coupled to the managed services offered as a service 354 via a wireless connection, a wired connection, or a combination thereof.

In a particular embodiment, the system 300 depicted in FIG. 3 the edge device 302 and hosted software, e.g., the edge throughput services management system 142 may monitor network usage, may provide network modeling, and may monitor quality of service. The edge device 302 and the edge throughput services management system 142 may have access to a database of ISP/speeds at the client location and may make network recommendations based on the network usage of the various devices and applications at the client location. The edge device 302 and the edge throughput services management system 142, via the managed services offered as a service 354, may make service/software recommendations to a network manager and remote users. These recommendations may include private networking recommendations, virtual private networking recommendations, security recommendations, client specific services/software recommendations, and support. While monitoring network usage, the edge device 302 and the edge throughput services management system 142 may indicate how much data bandwidth that a particular device or application at a home or office is consuming and may make network recommendations based on that network usage. The edge device 302 and the edge throughput services management system 142 may create personas for each device and then, may automatically determine a priority for the personas and/or applications.

During monitoring, if the edge device 302 and the edge throughput services management system 142 determines that the aggregate network usage of all devices at a particular client location are approaching the data bandwidth provided by the client's internet service provider (ISP), the edge device 302 and the edge throughput services management system 142 may recommend switching to a higher tier of service. If a higher tier of service is not available, the edge device 302 and the edge throughput services management system 142 may recommend a different ISP that provides better quality, i.e., faster, service. If the aggregate network usage is consistently lower than the data bandwidth provided by the client's ISP, the edge device 302 and the edge throughput services management system 142 may recommend moving to a lower, and cheaper, tier of service. Prior to moving to the lower tier of service, the edge device 302 and the edge throughput services management system 142 may throttle the current data bandwidth to model the lower tier of service in order to allow the client, or user, to experience the lower tier of service before making a decision to switch to the lower tier of service. Further, by monitoring the network usage of the various devices on a client network, the edge device 302 and the edge throughput services management system 142 are able to anticipate bottlenecks based on previous bottlenecks and in turn, select the best routing/requests for network slices in order to avoid the anticipated bottlenecks.

Figure 4:
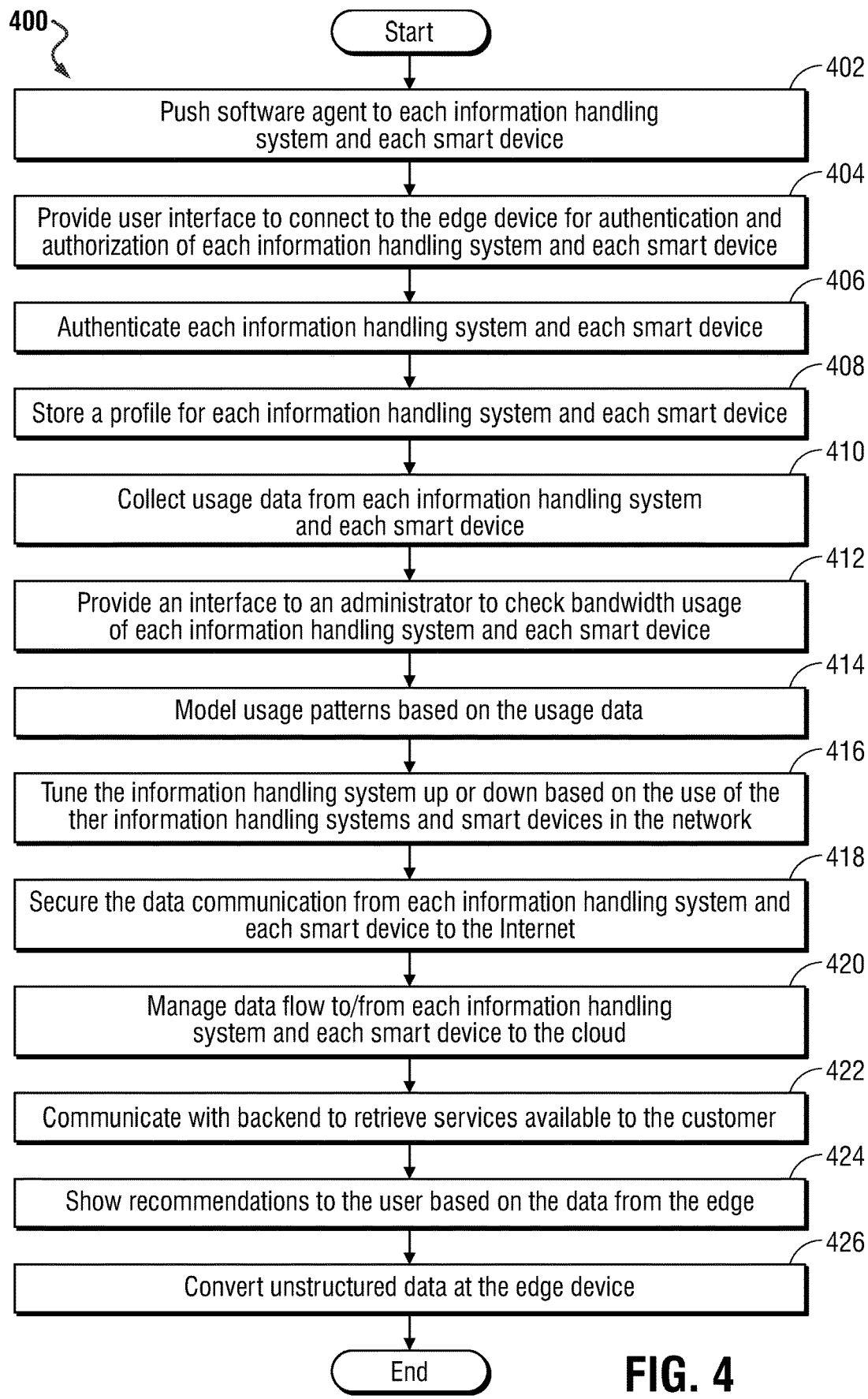
FIG. 4 is a flow diagram illustrating a method of managing a network and one or more devices operatively coupled to an edge device according to an embodiment of the present disclosure.

FIG. 4 is a flow diagram illustrating a method of managing a network and one or more devices operatively coupled to an edge device, generally designated 400 in an embodiment of the present disclosure. For example, an edge device may execute code instructions of an edge throughput services management system to manage access to computer resources and throughput of data for a plurality of managed endpoint devices such as endpoint information handling systems or smart devices on a mobile network. Commencing at block 402, in a particular embodiment, the method 400 may push a software agent for edge device throughput and services to each client information handling system 304, 306, 308 and each client smart device 340, 342, 344. For example, the edge device 302 may push the software agent for edge device throughput and services to each information handling system 304, 306, 308 and each smart device 340, 342, 344 via a wireless connection or a wired connection. At block 404, the method 400 may provide a user interface to connect to the edge device 302 for authentication and authorization of each information handling system 304, 306, 308 and each smart device 340, 342, 344. In an embodiment, the user interface is a graphical user interface (GUI) provided by the software agent for edge device throughput and services at each client information handling system 304, 306, 308 and each client smart device 340, 342, 344 having a display.

Proceeding to block 406, the method 400 may authenticate each information handling system 304, 306, 308 and smart device 340, 342, 344. In an embodiment, authentication may be performed using a password, a security key, comparing a subscriber identification module (SIM) to a database of authentic SIMS, comparing an electronic subscriber identification module (eSIM) to a database of authentic eSIMs, or a combination thereof. At block 408, the method 400 may store a profile for each information handling system 304, 306, 308 and each smart device 340, 342, 344 operatively coupled to the edge device 302. In an embodiment, the edge device 302 may store the profiles in a memory or database within the edge device 302 or a database operatively coupled to the edge device 302. In another embodiment, the edge device 302 may store the profiles in the cloud 354 operatively coupled to the edge device 302. At block 410, the method 400 may collect usage data from each information handling system 304, 306, 308 and each smart device 340, 342, 344. In an embodiment, the usage data is the network data bandwidth used by each information handling system 304, 306, 308 and each smart device 340, 342, 344 while it is operatively coupled to the edge device 302. The edge device 302 may collect the usage data from each information handling system 304, 306, 308 and each smart device 340, 342, 344 operatively coupled to the edge device 302.

Moving to block 412, the method 400 may provide an interface to an administrator to check data bandwidth usage of each information handling system 304, 306, 308 and each smart device 340, 342, 344. The interface may be a GUI that is presented to an administrator via an information handling system 304, 306, 308 or smart device 340, 342, 344 by a software agent for edge device throughput and services operating thereon. At block 414, in an embodiment, the method 400 may model usage patterns based on the usage data. The usage data may include a type of data, e.g., streaming, uploading, downloading, etc. Further, the usage data may include an amount of data bandwidth consumed. In a particular embodiment, an artificial intelligence module within the edge device 302 may monitor and record the usage data and from the usage data the AI module can predict future network data bandwidth used by each information handling system 304, 306, 308 and each smart device 340, 342, 344. At block 416, the method 400 may tune each information handling system 304, 306, 308 and each smart device 340, 342, 344 up or down based on the use of the other information handling systems 304, 306, 308 and smart devices 340, 342, 344 in the network. The devices may be tuned by throttling certain devices to guarantee other devices with higher priority. Further, devices may be tuned by adding network slices via a network slice selection function (NSSF). For example, a particular information handling system 304, 306, 308 or smart device 340, 342, 344 may have the greatest priority because it is an information handling system 304, 306, 308 or smart device 340, 342, 344 used for work activities of a user and in such a case, the network data bandwidth used by all other information handling systems 304, 306, 308 or smart devices 340, 342, 344 may be limited while the information handling system 304, 306, 308 or smart device 340, 342, 344 with the greatest priority is actively using the network for communication, data exchange, etc.

Continuing to block 418, the method 400 may secure the data communication from each information handling system 304, 306, 308 and smart device 340, 342, 344 to the Internet 352. For example, the edge device 302 may encrypt communication from each information handling system 304, 306, 308 and smart device 340, 342, 344 before transmitting the encrypted information to the Internet 352.

At block 420, the method 400 may manage data flow to/from each information handling system 304, 306, 308 and smart device 340, 342, 344 to the cloud. In embodiment, the edge device 302 may manage the data flow to/from each information handling system 304, 306, 308 and each smart device 340, 342, 344 based on the priority of each information handling system 304, 306, 308 and each smart device 340, 342, 344. For example, a particular information handling system 304, 306, 308 or smart device 340, 342, 344 having a relatively high priority may be allowed to upload or download data before an information handling system 304, 306, 308 or smart device 340, 342, 344 having a lower priority. This may be based on services, network slicing, or ISP adjustments.

At block 422, the method 400 may communicate with a backend to retrieve services available to the customer via managed services offered as a service 354 to one or more managed client information handling systems 304, 306, 308 or client smart devices 340, 342, 344. For example, the edge device 302 may communicate with a database within the cloud 354 to determine what services are available to the customer. Those services may include certain types of ISP service plans, software offers, device upgrade offers, ISP recommended service, network slicing service, inventory service, point of sale service, or a combination thereof. Moving to block 424, the method 400 may show recommendations to the user based on the data from the edge device 302. In an embodiment, the recommendations may be presented to the user via a GUI provided by the software agent for edge device throughput and services on an information handling system 304, 306, 308, smart device 340, 342, 344, or combination thereof. Finally, at block 426, the method may convert unstructured data at the edge device 302. For example, the backend services may change at any time and data that is being retrieved may change at any time. Often, the inbound data from the back end may be an amount of JavaScript object notation (JSON) that may not map to a user-defined constant at the edge device 302. For example, the backend may indicate that "POS service" is available, however, the edge device 302 may include a mapping to "Point of Sale Service" and it may not instantly recognize the "POS" indication. As such, intelligent mapping may convert the "POS" to "Point of Sale." For examples similar to the above, intelligent mapping may be used to convert unstructured data at the edge device 302. Thereafter, the method 400 may end.

Figure 5:
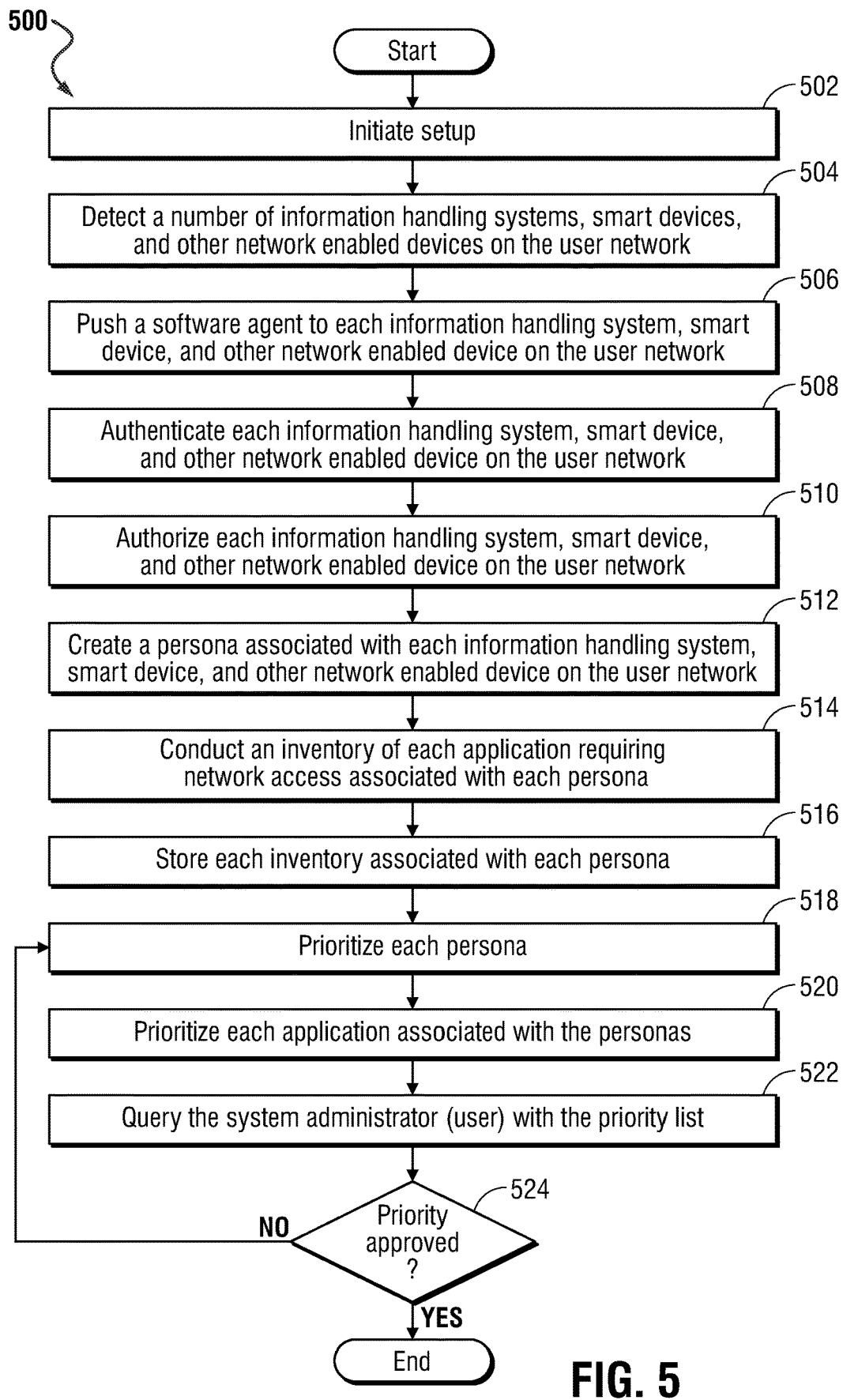
FIG. 5 is a flow diagram illustrating a method of setting up a device management network according to an embodiment of the present disclosure.

Referring now to FIG. 5, a method of setting up a device management network via an edge throughput services management system according to an embodiment of the disclosure is depicted and is generally designated 500. Beginning at block 502, the method 500 may initiate setup. In an embodiment, setup may be initiated by a software agent for edge throughput and services at an information handling system 304, 306, 308 or smart device 340, 342, 344 in communication with the edge device 302 offering throughput management and services. For example, a user, or administrator, may initiate setup via a software agent application or software operating at the information handling system 304, 306, 308 or smart device 340, 342, 344. At block 504, the method 500 may detect a number of information handling systems 304, 306, 308, smart devices 340, 342, 344, and other network enabled devices on the user network. In an embodiment, an edge device 302 with an edge throughput management system 142 may detect a number of client or endpoint information handling systems 304, 306, 308, endpoint smart devices 340, 342, 344, and other network enabled client or endpoint devices on the user network. For example, the edge device 302 may advertise edge services to an endpoint device, e.g., an information handling system or smart device, and the endpoint devices may respond thereto. Further, the edge device 302 may issue a JavaScript object notation (JSON) to the endpoint devices that includes the edge device capabilities and services. This may allow for ISP assessment, slice management for data bandwidth guarantees, hardware upgrade offers, hosted services, and other services.

At block 506, the method 500 may push a software agent for edge device throughput and services to each information handling system 304, 306, 308, smart device 340, 342, 344, and other network enabled device on the user network. The software agent for edge device throughput and services may be pushed, or otherwise transmitted, to each information handling system 304, 306, 308, smart device 340, 342, 344, and other network enabled device via a wireless connection, a wired connection, or a combination thereof. Further, the software agent for edge device throughput and services may be an application or software that may be uploaded to each information handling system 304, 306, 308, smart device 340, 342, 344, or other network enabled device. The software agent for edge device throughput and services may provide a GUI that will allow the user, or administrator, to interact with the edge device 302. In an embodiment, the information handling systems 304, 306, 308, smart devices 340, 342, 344, and other network enabled devices that are managed with the edge services throughput management system such as 142 may automatically connect to the edge device 302 when powered on with the software agent for edge throughput and services 140 or upon executing the software agent for edge throughput and services 140

Moving to block 508, the method 500 may authenticate each information handling system 304, 306, 308, smart device 340, 342, 344, and other network enabled device on the user network. In an embodiment, the edge device 302 may authenticate each information handling system 304, 306, 308, smart device 340, 342, 344, and other network enabled device on the user network and authentication may be performed using a password, a security key, comparing a subscriber identification module (SIM) to a database of authentic SIMS, comparing an electronic subscriber identification module (eSIM) to a database of authentic eSIMs, or a combination thereof. Further, client or endpoint information handling system 304, 306, 308, smart device 340, 342, 344, or other network enabled device on the user network may be similarly authenticated with access to the edge device 302 for edge device throughput management services according to some embodiments herein. At block 510, the method 500 may authorize each information handling system 304, 306, 308, smart device 340, 342, 344, and other network enabled device on the user network. For example, the edge device 302 may authorize each information handling system 304, 306, 308, smart device 340, 342, 344, and other network enabled device on the user network to connect with the edge device 302 on a permanent basis while powered on and access throughput management and offered services according to embodiments herein.

At block 512, the method 500 may create a persona associated with each information handling system 304, 306, 308, smart device 340, 342, 344, and other network enabled device on the user network. For example, in an embodiment, the edge device 302 may create the persona for each information handling system 304, 306, 308, smart device 340, 342, 344, and other network enabled device on the user network based on a user-given name for each information handling system 304, 306, 308, smart device 340, 342, 344, and other network enabled device on the user network. Examples of personas created by the edge device 302 may include "desktop computer," "lap top computer," "smart TV 01," "smart TV 02," "mobile phone 01," "mobile phone 02," etc. The personas may include some other appropriate identification like a model number for a particular device, a serial number for a particular device, a room location for a particular device, or a combination thereof. Next at block 514, the method 500 may conduct an inventory of each application requiring network access associated with each persona. In an embodiment, the software agent for edge device throughput and services on each information handling system 304, 306, 308, smart device 340, 342, 344, and other network enabled device on the user network may conduct the inventory and report the information back to the edge device 302. At block 516, the method 500 may store each inventory associated with each persona. For example, the inventory associated with each personal may be stored within a memory of the edge device 302. In another embodiment, the inventory and persona data may be stored within a database at the cloud 354.

Proceeding to block 518, the method 500 may prioritize each persona. In an embodiment, priority may be set based on the device type, the types of applications requiring network access in each device, times of day, days of a week, or a combination thereof. For example, a desktop computer or laptop computer may be given higher priority than a smart refrigerator. Alternatively, a gaming laptop may be given priority over a work computer after typical work hours. Further, at block 520, the method 500 may prioritize each application associated with the personas. For example, a home may have a collection of heterogeneous devices (e.g., tablets, PCs, game consoles, etc.) If a work from home employee is in a video conference, the employee may not get the required data bandwidth because other users in the family are consuming the data bandwidth to stream content or games. In this instance, the video conference application may be given the highest priority during work hours. Gaming or video streaming applications may be given high priority for data bandwidth in examples during non-working hours. At block 522, the method 500 may query the system administrator (user) with the priority list. At decision 524, the method 500 may determine whether priority approved is approved by the system administrator of a customer. If not, the method 500 may return to block 518 and re-prioritize each persona. Thereafter, the method 500 may continue as described herein. Conversely, at decision 524, if priority is approved, the method 500 may end.

Figure 6:
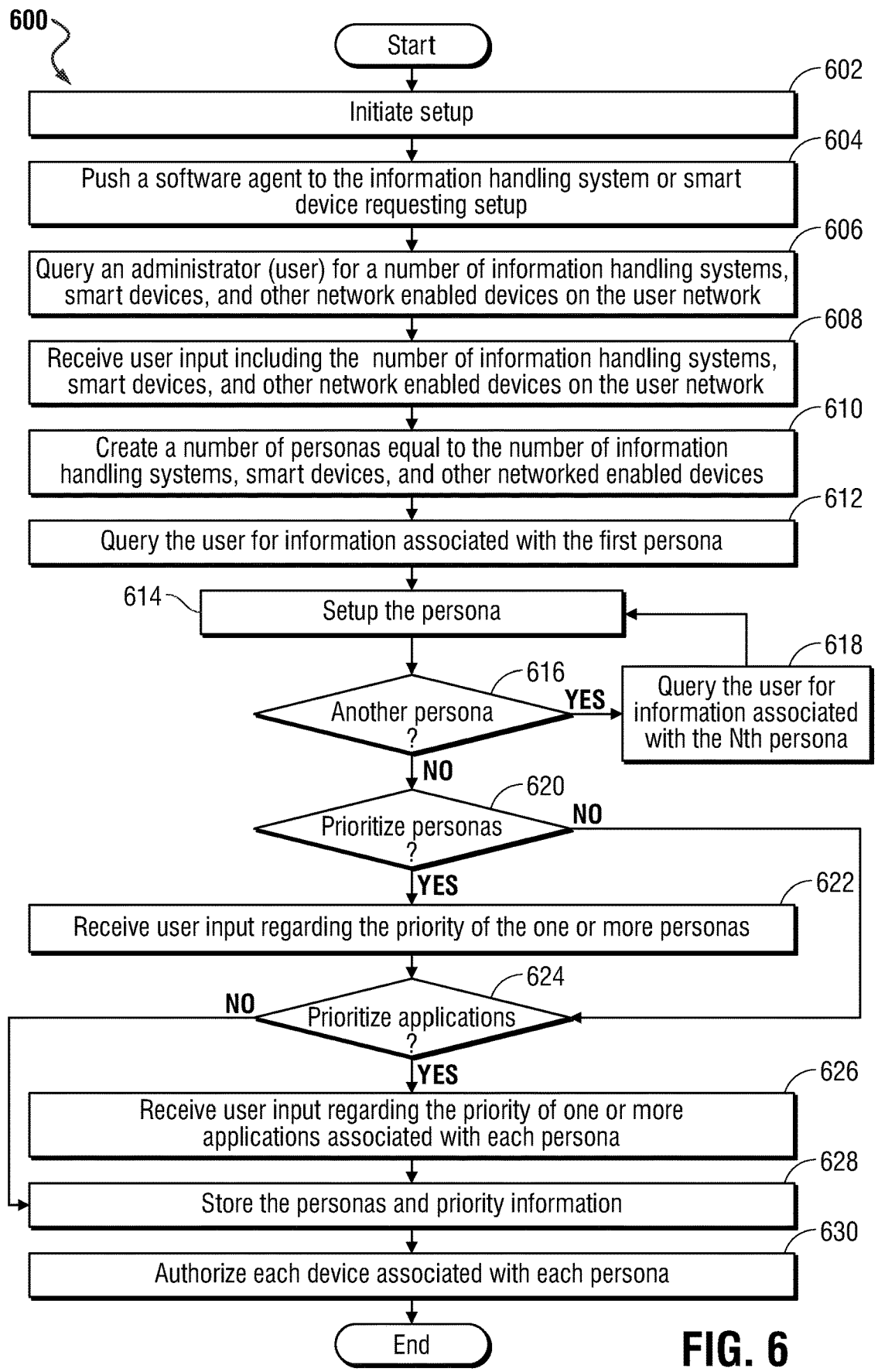
FIG. 6 is a flow diagram illustrating a method of setting up a device management network according to another embodiment of the present disclosure.

Referring to FIG. 6, a method of setting up a device management network according to an embodiment of the disclosure is depicted and is generally designated 600. Beginning at block 602, the method 600 may initiate setup. For example, set up may be requested by an endpoint information handling system 304, 306, 308 that is operatively coupled to an edge device 302 that includes an edge throughput management system 142. At block 604, the method 600 may push a software agent for edge device throughput and services 140 to the information handling system 304, 306, 308 or smart device 340, 342, 344 requesting setup. In an embodiment, the edge device 302, e.g., the edge throughput management system 142 therein, may push the software agent for edge device throughput and services 140 to the information handling system 304, 306, 308 or smart device 340, 342, 344 via a wireless connection, a wired connection, or a combination thereof. At block 606, the method 600 may query an administrator, or user, for a number of information handling systems 304, 306, 308, smart devices 340, 342, 344, and other network enabled devices on the user network and operably coupled to the edge device 302 to be managed under the edge throughput management system 142 at the edge device 302. For example, the software agent for edge device throughput and services on the information handling system 304, 306, 308 or smart device 340, 342, 344 may provide a GUI and the administrator, or user, may be queried via the GUI. At block 608, the method 600 may receive user or IT manager input, i.e., manual input, including the number of information handling systems, smart devices, and other network enabled devices to have access to edge management on the user network. In an embodiment, the user input may be received via the software agent for edge device throughput and services on the information handling system 304, 306, 308 or smart device 340, 342, 344 and then, transmitted to the edge device 302.

Moving to block 610, the method 600 may create a number of personas equal to the number of information handling systems 304, 306, 308, smart devices 340, 342, 344, and other networked enabled devices that are operably coupled to the edge device 302 and to be managed and to be offered edge services by the edge throughput management system 142. In an embodiment, the edge device 302 may create a persona for each information handling system 304, 306, 308, smart device 340, 342, 344, or other networked enabled device that is operably coupled to the edge device 302. At block 612, the method 600 may query the user for information associated with the first persona. For example, the software agent for edge device throughput and services on the information handling system 304, 306, 308 or smart device 340, 342, 344 may present a query to the user via a GUI. The information associated with the first persona may include a device name, a user name, a device location, a device type, one or more applications operating with the device, an administrator designation, or a combination thereof. Proceeding to block 614, the method 600 may setup the persona.

Next, at decision 616, the method 600 may determine whether there is another persona. For example, the software agent for edge device throughput and services on the information handling system 304, 306, 308 or smart device 340, 342, 344 may present a query to the user via a GUI for another persona for another information handling system 304, 306, 308 or smart device 340, 342, 344. At decision 616, if there is another persona, the method 600 may proceed to block 618 and the method 600 may query the user for information associated with the Nth persona. As before, the software agent for edge device throughput and services 140 on each information handling system 304, 306, 308 or smart device 340, 342, 344 may present a query to the user via a GUI regarding the persona and the information associated with the Nth persona may include a device name, a user name, a device location, a device type, one or more applications operating with the device, an administrator designation, or a combination thereof. Thereafter, the method 600 may return to 614 and continue as described herein.

At decision 616, if the method 600 determines that there is no other persona to be established among information handling system 304, 306, 308 or smart devices 340, 342, 344, the method 600 may proceed to decision 620 and the method 600 may determine whether to prioritize the personas. In an embodiment, the software agent for edge device throughput and services on the information handling system 304, 306, 308 or smart device 340, 342, 344 may query the user, or administrator, to determine if they would like to prioritize the personas. If, at decision 620, the method 600 determines that the personas should be prioritized based on the user, or administrator input, the method 600 may proceed to block 622 and the method 600 may receive user input regarding the priority of the one or more personas. In an embodiment, the software agent for edge device throughput and services on the information handling system 304, 306, 308 or smart device 340, 342, 344 may receive the user input via a GUI presented, or displayed, at the information handling system 304, 306, 308 or smart device 340, 342, 344. Further, the priority of each persona may indicate which persona is to be given greater access to one or more network resources and network data bandwidth. For example, a persona associated with a parental work device may be given the greatest priority during typical work hours (9 am to 5 pm, Monday through Friday). Moreover, for example, a persona associated with a gaming device, or a persona associated with a smart television, may be given the greatest priority during hours that are not typical works hours (5 pm to 9 am, Monday through Friday and 12 am to 12 pm weekends). From block 622, the method 600 may proceed to decision 624.

Returning to decision 620, if the method 600 determines that the personas are not to be prioritized, the method 600 may also move to decision 624. At decision 624, the method 600 may determine whether to prioritize the applications associated with, or operating on, all of the information handling systems 304, 306, 308 or the smart devices 340, 342, 344 for which edge management and services are to apply. In an embodiment, the software agent for edge device throughput and services on the information handling system 304, 306, 308 or smart device 340, 342, 344 may query the user, or administrator, to determine if they would like to prioritize the applications. If, at decision 624, the method 600 determines that the applications should be prioritized based on the user, or administrator input, the method 600 may proceed to block 626 and the method 600 may receive user input regarding the priority of the one or more applications. In an embodiment, the software agent for edge device throughput and services on the information handling system 304, 306, 308 or smart device 340, 342, 344 may receive the user input via a GUI presented, or displayed, at the information handling system 304, 306, 308 or smart device 340, 342, 344. Further, the priority of each application may indicate which application, regardless of persona (i.e., information handling system 304, 306, 308, smart device 340, 342, 344, or network enabled device) is to be given greater access to one or more network resources and network data bandwidth. For example, a video conferencing application with a parental work device may be given the greatest priority during typical work hours (9 am to 5 pm, Monday through Friday). Moreover, a streaming application, e.g., for a smart television, may be given the greatest priority during hours that are not typical works hours (5 pm to 9 am, Monday through Friday and 12 am to 12 pm weekends). From block 626, the method 600 may continue to block 628.

Returning to decision 624, if the method 600 determines that the applications are not to be prioritized, the method 600 may also continue to block 628. At block 628, the method 600 may store the personas and priority information associated with the information handling systems 304, 306, 308, smart devices 340, 342, 344, or network enabled devices. For example, the method 600 may store the personas and priority information at the edge device 302, within the cloud 354, or a combination thereof. Moving to block 630, the method 600 may authorize each device associated with each persona. In a particular embodiment, the edge device 302 may authorize the devices by adding an identifier of each device or persona to a database of authorized devices for the particular network in question. Thereafter, the method 600 may end. It is to be understood that the method 600 may allow use to prioritize only personas (i.e., devices), personas and applications, only applications, or to opt to have no priority at all.

Figure 7A:
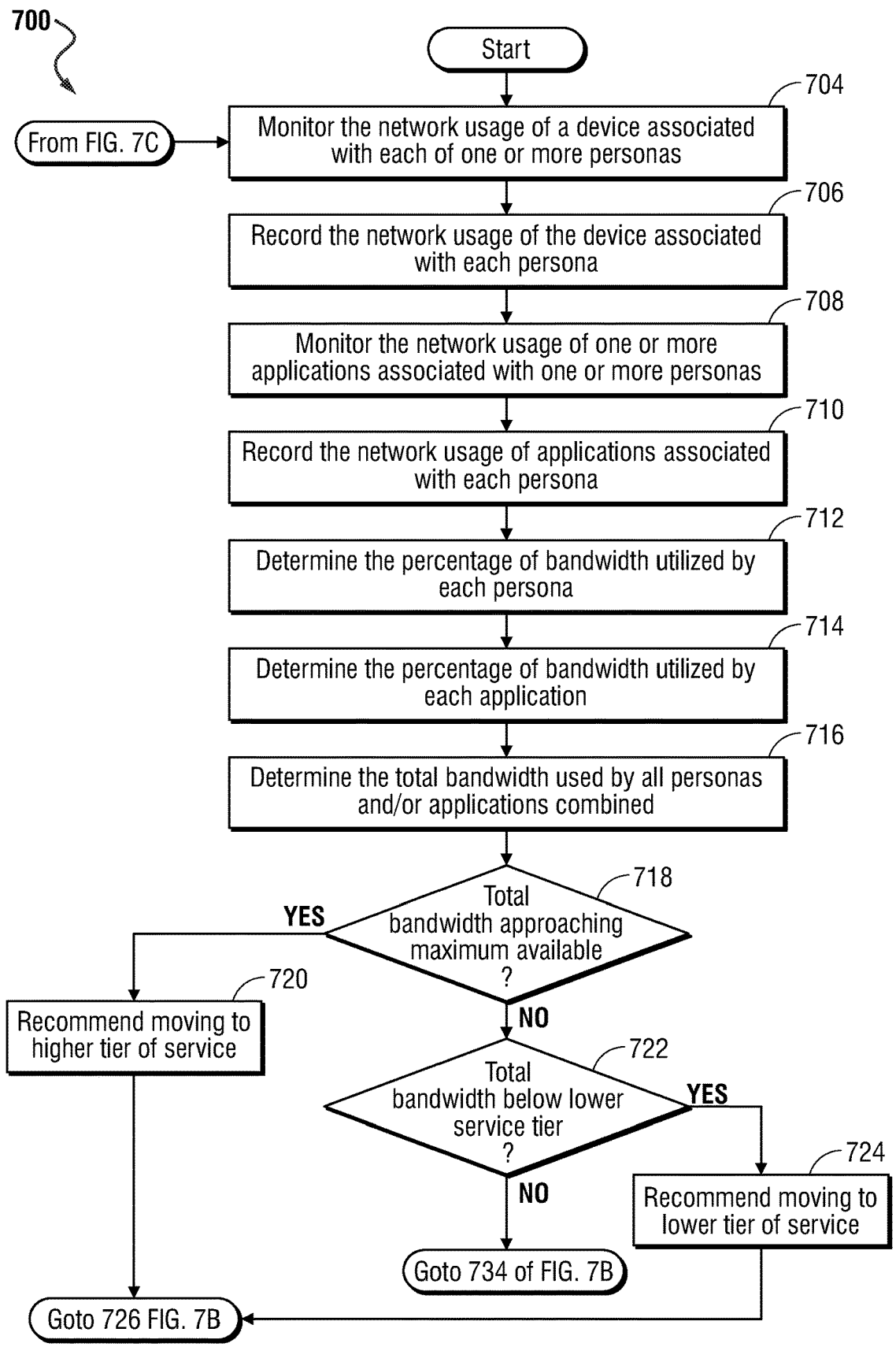
FIG. 7A is a flow diagram illustrating a first portion of a method of managing a network and one or more devices operatively coupled to an edge device according to another embodiment of the present disclosure.
Figure 7B:
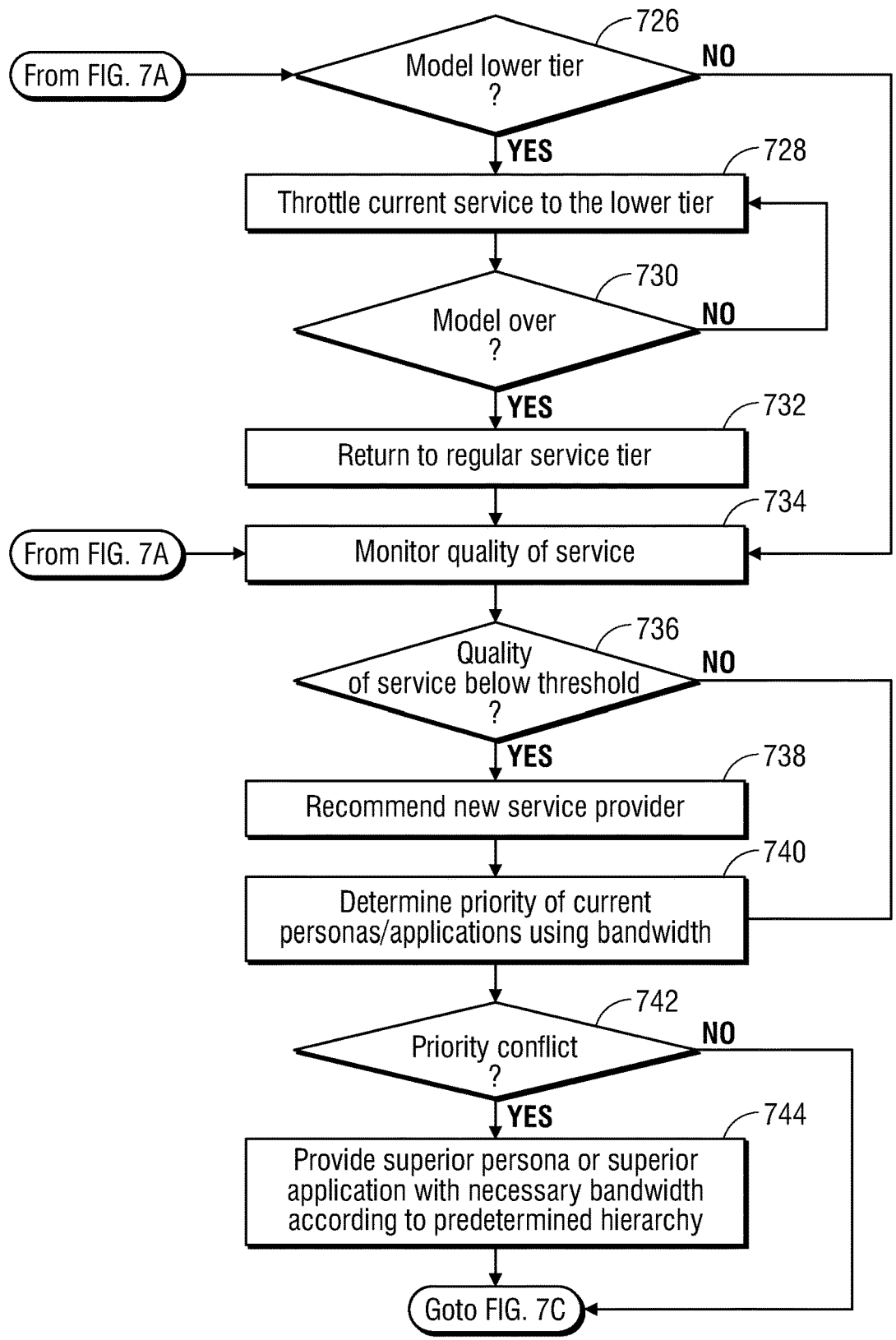
FIG. 7B is a flow diagram illustrating a second portion of a method of managing a network and one or more devices operatively coupled to an edge device according to another embodiment of the present disclosure.
Figure 7C:
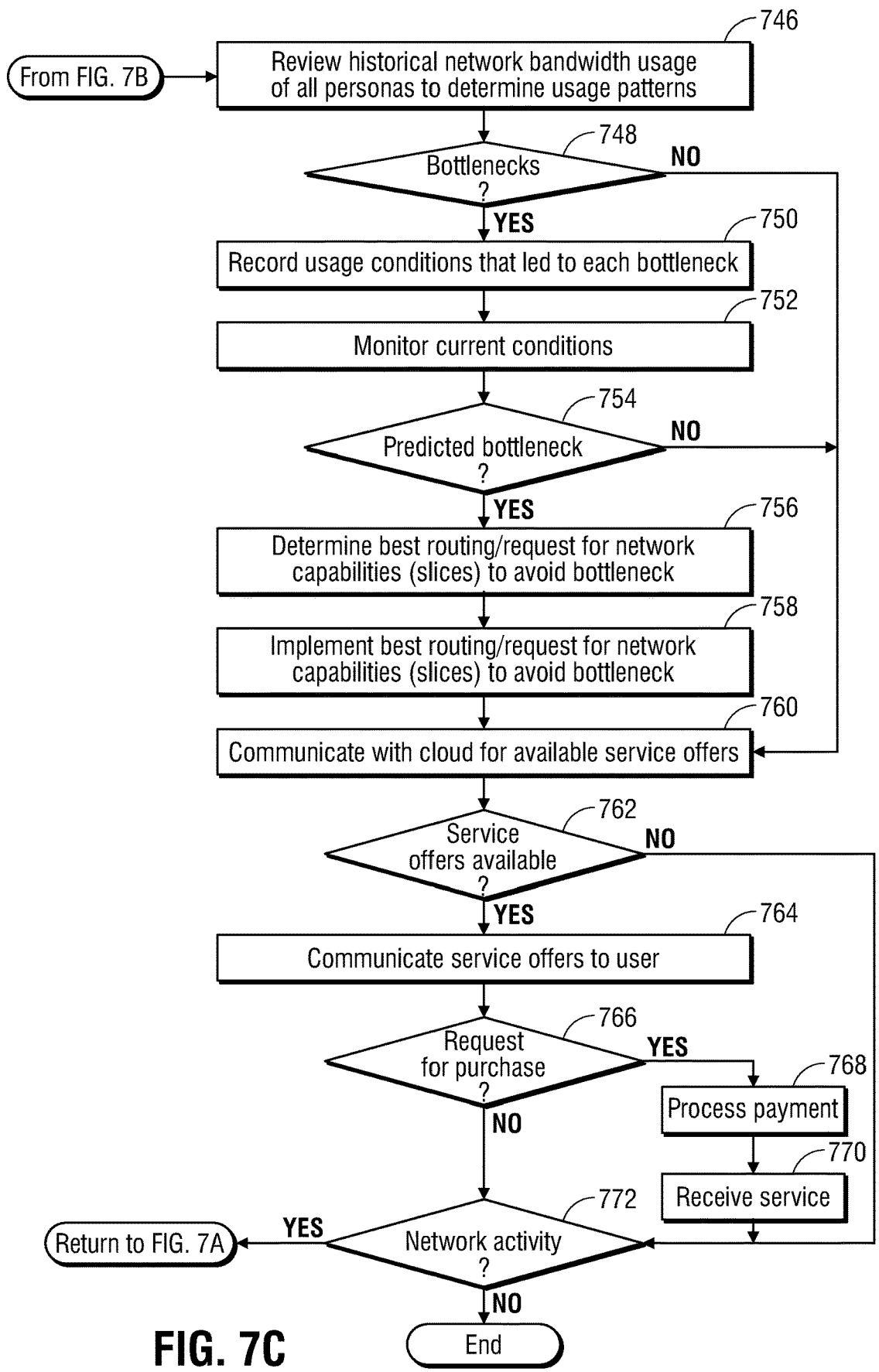
FIG. 7C is a flow diagram illustrating a third portion of a method of managing a network and one or more devices operatively coupled to an edge device according to another embodiment of the present disclosure.

Referring now to FIG. 7A through FIG. 7C, a method of managing a network and one or more devices operatively coupled to an edge device according to another embodiment of the present disclosure is illustrated and is generally designated 700. Commencing at block 702, during network activity, one or more of the following steps, i.e., steps 704 through 772 may be algorithmically executed. At block 704, the method 700 may monitor the network usage of a device associated with each of one or more personas. For example, in an embodiment of the disclosure, the edge device 302 may monitor the network usage of each device by monitoring the usage of each wireless network connection or wired network connection provided by the edge device 302 to each device. It is to be understood that the network data bandwidth of each device may be monitored by the edge device 302. Moving to block 706, the method 700 may record the network usage of the device associated with each persona. In an embodiment, the edge device 302 may record the network usage, i.e., network data bandwidth, of each device within a database at the edge device 302, within a database at the cloud 354, or a combination thereof. For example, at a home with have a collection of heterogeneous devices (e.g., tablets, PCs, game consoles, etc.), the data bandwidth consumed by each device may be monitored and recorded. At a restaurant having multiple point of sale terminals, inventory management information handling systems, interactive menus, etc., the data bandwidth consumed by each device may be monitored and recorded. Further, in a first responder situation having body worn cameras, vehicle cameras, street cameras, smart sensors, emergency sensors, the data bandwidth of each device may be monitored and recorded.

Continuing to block 708, the method 700 may monitor the network usage of one or more applications associated with one or more personas. For example, in an embodiment of the disclosure, the edge device 302 may monitor the network usage of each application by monitoring the usage of each wireless network connection or wired network connection provided by the edge device 302 to each application. It is to be understood that the network data bandwidth of each application may be monitored by the edge device 302. Moving to block 710, the method 700 may record the network usage of the applications associated with each persona. In an embodiment, the edge device 302 may record the network usage, i.e., network data bandwidth, of each application within a database at the edge device 302, within a database at the cloud 354, or a combination thereof. For example, at a home with have a collection of heterogeneous devices (e.g., tablets, PCs, game consoles, etc.), the data bandwidth consumed by certain applications at each device may be monitored and recorded. At a restaurant having multiple point of sale terminals, inventory management information handling systems, interactive menus, etc., the data bandwidth consumed by the applications on each device may be monitored and recorded. Further, in a first responder situation having body worn cameras, vehicle cameras, street cameras, smart sensors, emergency sensors, the data bandwidth of applications operating on each device may be monitored and recorded.

At block 712, the method 700 may determine the percentage of data bandwidth utilized by each persona. In an embodiment, the edge device 302 may determine the percentage of data bandwidth used by a particular persona by dividing the current usage of the particular persona by the total available data bandwidth according to a service contract and multiplying that result by one hundred. Moving to block 714, the method 700 may determine the percentage of data bandwidth utilized by each application. In an embodiment, the edge device 302 may determine the percentage of data bandwidth used by a particular application by dividing the current usage of the particular application by the total available data bandwidth per a service contract and multiplying that result by one hundred. At block 716, the method 700 may determine the total data bandwidth used by all personas and/or applications combined. In a particular embodiment, the edge device 302 may determine the total data bandwidth currently being used by all personas and/or applications by summing the usage of each individual persona and/or application.

Proceeding to decision 718, the method 700 may determine whether the total data bandwidth currently being consumed is approaching maximum available. In an embodiment, the edge device 302 may compare the current total data bandwidth being used to a maximum available data bandwidth according to a service contract in order to determine whether the current total data bandwidth is approaching the maximum available data bandwidth. For example, if the current total data bandwidth is greater than ninety percent (90%) of the maximum available data bandwidth, the current total data bandwidth may be considered to be approaching the maximum available data bandwidth. If so, the method 700 may proceed to block 720 and the method 700 may recommend moving to higher tier of service. For example, the edge device 302 may make the recommendation via a GUI provided by the software agent for edge device throughput and services at a device that is deemed an administrator device or at a device that is associated with an administrator persona. In embodiment, the recommendation to move to a higher tier of service may include the network data bandwidth, or speed, offered by the higher tier of service and the cost of the higher tier of service. Thereafter, the method 700 may continue to decision 726 of FIG. 7B.

Returning to decision 718, if the total data bandwidth is not approaching the maximum available, the method 700 may proceed to decision 722. At decision 722, in an embodiment, the method 700 may determine whether the total data bandwidth currently being utilized is below a lower service tier. In an embodiment, the edge device 302 may compare the current total data bandwidth being used to one or more lower service tiers offered by a service provider to determine whether the current total data bandwidth is lower than a lower service tier. For example, if a lower service tier offered is five megabits per second (Mbps) and the current total data bandwidth less than 5 Mbps, the current total data bandwidth may be considered to be below, or lower than, the lower service tier. If the total data bandwidth used is lower than a lower tier of service, the method 700 may proceed block 724 and the method 700 may recommend moving to lower tier of service. For example, the edge device 302 may make the recommendation via a GUI provided by the software agent for edge device throughput and services at a device that is deemed an administrator device or at a device that is associated with an administrator persona. In an embodiment, the recommendation to move to the lower service tier may include the cost savings associated with moving to a lower service tier. Thereafter, the method 700 may continue to decision 726 of FIG. 7B. Returning to decision 722, if the total data bandwidth is not below the lower service tier, the method may move to block 734 of FIG. 7B.

Moving now to FIG. 7B, at decision 726, the method 700 may determine whether to model lower tier of service offered. Modeling the lower tier of service may allow the user to experience the lower tier of service and determine if the lower tier of service is appropriate for the amount of devices at the user location. Modeling the lower tier of service may also be appropriate if the network users mostly limit their network usage to low data bandwidth activity such as browsing and do not participate in gaming that may require high quality streaming services and high data bandwidth. In a particular embodiment, the edge device 302 may query the administrator, or user, via the software agent for edge device throughput and services on the administrator device to determine whether to model the lower service tier. If the method 700 determines to model the lower tier of service, the method 700 may proceed to block 728 and the method 700 may throttle the current service to the lower tier. In an embodiment, the edge device 302 may lower the current data bandwidth to the data bandwidth offered in the lower tier of service. The throttled service used to model the lower tier of service to the user may be provided for a predetermined period of time. At decision 730, the method 700 may determine whether the modeled service is over. If not, the method 700 may return to block 728 and the method 700 may continue as described herein. At decision 730, if the modeled service ends, the method 700 may continue to block 732 and the method 700 may return the service to the regular service tier provided to the user. In an embodiment, the edge device 302 may remove any throttling on the data in order to provide the network data bandwidth provide for in the current service agreement. From block 732, the method 700 may move to block 734. Moreover, returning to decision 726, if the method 700 determines that the lower tier of service is not to be modeled, the method 700 may continue directly to block 734. Block 734 may also be reached from decision 722 of FIG. 7A when the total data bandwidth is not below the lower tier of service. In that case, modeling the lower tier of service is unnecessary and the method 700 may proceed directly to block 734 of FIG. 7B.

At block 734 of FIG. 7B, the method 700 monitor quality of service (QoS) provided by the user network. In an embodiment, the edge device 302 may monitor the QoS by monitoring one or more QoS metrics, e.g., a signal-to-noise (SNR) ratio, latency, throughput, or a combination thereof. At decision 736, the method 700 may determine whether the QoS is below a threshold. For example, the edge device 302 may compare each QoS metric to a service agreement and if any of these QoS metrics fall below a threshold set forth in the service agreement, the edge device 302 may deem the QoS to be below the service agreement threshold. If the QoS is below the service agreement threshold, the method 700 may move to block 738 and the method 700 may recommend a new service provider. In an embodiment, the edge device 302 may have access to a database of service providers, e.g., via the cloud 354, and the edge device 302 may search this database for other service providers and recommend one or more of them to the user via the software agent for edge device throughput and services at the user device.

Thereafter, the method 700 may proceed to block 740. Returning to decision 736, when the QoS is not below the threshold provided for the in service agreement, the method 700 may also proceed to block 740. At block 740, the method 700 may determine the priority of the current personas and applications using network data bandwidth. At decision 742, the method 700 may determine whether there is a priority conflict. For example, the edge device 302 may search the database of personas to determine the priority of each persona and application currently utilizing network data bandwidth. If there is a priority conflict at decision 742, the method 700 may proceed to block 744 and the method 700 may resolve the conflict and may provide superior persona or superior application with necessary data bandwidth according to the predetermined hierarchy that was previously determined by the edge device 302 with input from the administrator or the hierarchy that was set by the administrator. Thereafter, the method 700 may proceed to block 746 of FIG. 7C. Returning to decision 742, if there are not any priority conflicts, the method 700 may proceed directly to block 746 of FIG. 7C.

At block 746 of FIG. 7C, the method 700 may review historical usage of all personas to determine usage patterns of the devices associated with the personas. For example, in an embodiment, the edge device 302 can review the historical network data bandwidth usage associated with each persona that was previously store. At decision 748, the method 700 may determine whether there were any bottlenecks in the data flow based on the historical network data bandwidth usage of the devices associated with the personas. For example, a bottleneck may be recognized when a plurality of devices are constantly using a high rate of bandwidth (Mbps) over a specific time and the edge device 302 is also using a maximum allowable bandwidth. If another device instantly requests additional data bandwidth that is atypical, the edge device 302 has make decision of time slicing across multiple devices. If there were bottlenecks, the method 700 may continue to block 750 where the method 700 may record those usage conditions that lead to each bottleneck. In an embodiment, the edge device 302 may record those usage conditions within a memory at the edge device 302, within a database at the cloud 354, or a combination thereof. Next, at block 752, the method 700 may monitor current conditions. The edge device 302, for example, may monitor the current network data bandwidth usage conditions of each device associated with the personas.

Moving to decision 754, the method 700 may determine whether there is a predicted bottleneck. In an embodiment, the edge device 302 may compare the current network conditions to the recorded conditions that let to bottlenecks to determine whether the current conditions may cause a bottleneck in data flow. If there is a predicted bottleneck at decision 754, the method 700 may proceed to block 756 where the method 700 may determine best routing/request for network capabilities (slices) to avoid bottleneck. For example, the edge device 302 may add slices via the network core NSSF if available. Further, in an embodiment, the edge device 302 may create a virtual network instance for some devices of specific IP address that may receive constant QoS over a specific time. These devices may include devices that are configured as work laps and as such, they may receive uninterrupted data bandwidth and QoS during office hours by dedicating an isolated line out of network. Thereafter, the method 700 may proceed to block 758 and the method 700 may implement best routing/request for network capabilities (slices) to avoid the potential bottleneck. Thereafter, the method 700 may proceed to block 760. Returning to decision 748, if there were not bottlenecks in the historical network data bandwidth usage, the method 700 may also proceed to block 760. Further, at decision 754, if there is not a predicted bottleneck 754, the method 700 may proceed to block 760, as well.

At block 760, the method 700 may communicate with the cloud 354 for available service offers. In an embodiment, the edge device 302 may communicate with the cloud 354 to receive any service offers. For example, service offers may include the availability of new streaming services, the availability of new data services, the availability of new security services, etc. At decision 762, the method 700 may determine whether any service offers are available 762. If so, the method 700 may proceed to bock 764 and the method 700 may communicate the available service offers to the administrator, or user. For example, the edge device 302 may communicate the available service offers via the software agent for edge device throughput and services at the user device.

Proceeding to decision 766, the method 700 may determine whether a request for purchase has been received. In an embodiment, the request for purchase may be received via the software agent for edge device throughput and services at the user device and transmitted to the edge device. If a request for purchase is received, the method 700 may continue to block 768 and a payment may be processed. For example, the edge device 302 may receive the payment information via the software agent for edge device throughput and services at the user device and transmit the payment information to the cloud 354 for processing. After the payment is processed, the method 700 may move to block 770 and the service may be received. For example, the service may be received at the edge device 302 and provided to the user device via the software agent for edge device throughput and services. Thereafter, the method 700 may move to decision 772 where the method 700 may determine whether there is network activity. If there is no network activity, the method 700 may end. Otherwise, if network activity continues, the method 700 may return to block 704 of FIG. 7A and continue as described herein.

Returning to decision 762, if there are not any service offers available, the method may proceed directly to decision 772 and continue as described herein. Moreover, returning to decision 766, if there is not a request for purchase, the method 700 may also move to decision 772 and continue as described.

The blocks of the flow diagrams of FIG. 4 through FIG. 7C or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Information handling systems, modules, resources, or programs that are in communication with one another need not be in continuous communication with each other, unless expressly specified otherwise. In addition, information handling systems, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An edge device information handling system comprising:

a processor;
a memory;
a power management unit (PMU);
the processor to execute code instructions of an edge throughput services management system for managing a wireless network and one or more client information handling system devices operatively coupled to the network and the edge information handling system, wherein the processor is configured to:
  detect a plurality of managed client information handling systems operatively executing code instruction of a throughput management agent and that are coupled to the edge device information handling system via the wireless network;
  create a persona associated with each of the managed client information handling systems including smart devices, network enabled devices, or the combination thereof;
  conduct an inventory of one or more applications requiring network access associated with each persona;
  prioritize each persona for network access; and
  prioritize each application associated with each persona for network access; and
the processor to execute the edge throughput services management system to provide an internet services provider adjustment service to managed client information handling systems to adjust data bandwidth availability to the wireless network based on detected data bandwidth consumption and client information handling system personas according to a priority hierarchy.

2. The information handling system edge device of claim 1, further comprising:
  the processor to execute code instructions for of an edge throughput services management system configured to monitor network usage of each managed client information handling system associated with each persona; and
  the memory to record the network usage for each information handling system, smart device, or network enable device associated with each persona.

3. The edge device information handling system of claim 1, further comprising:
  the processor configured to monitor network usage of the one or more applications associated with each persona; and
  the memory to record the network usage of the one or more applications associated with each persona.

4. The edge device information handling system of claim 1, further comprising:
  the processor configured to determine a total data bandwidth used by all personas and applications; and
  the edge throughput services management system to recommend moving to a higher tier of service when the total data bandwidth used exceeds a threshold percent of a total data bandwidth available.

5. The edge device information handling system of claim 1, further comprising:
  the processor configured to determine a total data bandwidth used by all personas and applications; and
  the edge throughput services management system to recommend moving to a lower tier of service when the total data bandwidth used is less than a lower tier of service available.

6. The edge device information handling system of claim 5, further comprising:
  the edge throughput services management system to throttle a current service to the lower tier of service in order to model the lower tier of service.

7. The edge device information handling system of claim 1, further comprising:
  the edge throughput services management system to monitor one or more quality of service metrics; and
  the edge throughput services management system to recommend a new service provider when one or quality of service metrics falls below a predetermined threshold.

8. A method implemented at an edge device information handling system comprising:
  detecting a plurality of managed client information handling systems executing a throughput management agent and operatively coupled to a wireless network and the edge device information handling system;
  creating, via a processor executing code instructions of an edge throughput services management system, a persona associated with each of the managed client information handling systems;
  conducting an inventory of one or more applications requiring network access associated with each persona;
  prioritizing each persona for network access;
  prioritizing each application associated with each persona for network access; and
  monitoring and recommending adjustments to the wireless network and adjustments to the managed client information handling systems for flexible data bandwidth access to the wireless network with the edge throughput services management system; and
  assigning network data bandwidth to personas and applications of managed client information handling systems according to a priority hierarchy.

9. The method of claim 8, further comprising:
monitoring network usage of each detected, managed client information handling system associated with each persona;
recording, in a memory, the network usage for each detected, managed client information handling system associated with each persona.

10. The method of claim 9, further comprising:
monitoring network usage of the one or more applications associated with each persona; and
recording the network usage of the one or more applications associated with each persona.

11. The method of claim 8, further comprising:
determining a total data bandwidth used by all personas and applications; and
recommending moving to a higher tier of service when the total data bandwidth used exceeds percent threshold of a total data bandwidth available.

12. The method of claim 8, further comprising:
determining a total data bandwidth used by all personas and applications; and
recommending moving to a lower tier of service when the total data bandwidth used is less than a lower tier of service available.

13. The method of claim 12, further comprising:
throttling a current service to the lower tier of service in order to model the lower tier of service for data bandwidth usage.

14. The method of claim 8, further comprising:
monitoring one or more quality of service metrics; and
recommending a new service provider when one or quality of service metrics falls below a predetermined threshold.

15. An edge device information handling system comprising:
- a processor;
- a memory;
- a power management unit (PMU);
- the processor executing code instructions of an edge throughput services management system for managing a wireless network and one or more devices operatively coupled to the wireless network and the edge device information handing system, wherein the edge throughput services management system is configured to:
  - detect a plurality of managed client information handling systems executing code instructions of a throughput management system and operatively coupled to the wireless network and the edge device information handling system;
  - create a persona associated with each of the detected, managed client information handling systems;
  - conduct an inventory of one or more applications requiring network access associated with each persona;
  - prioritize each persona for network access; and
  - prioritize each application associated with each persona for network access; and
- the edge throughput services management system to provide a service configured to monitor and to recommend adjustments to the wireless network and managed client information handling systems for flexible data bandwidth access to the wireless network and to assign network data bandwidth to personas and applications of managed client information handling systems according to a priority hierarchy.

16. The edge device of claim 15, further comprising:
the edge throughput services management system to analyze historical network data bandwidth usage of all personas to determine usage patterns.

17. The edge device of claim 16, wherein the processor further:
- the edge throughput services management system to identify previous data bandwidth bottlenecks in the wireless network data bandwidth usage; and
- the memory to record usage conditions that led to identified data bandwidth bottlenecks.

18. The edge device information handling system of claim 17, wherein the edge throughput services management system implements recommend adjustments to the wireless network according to a best routing determination in the wireless network core to adjust available data bandwidth access to the wireless network for the managed client information handling systems.

19. The edge device information handling system of claim 15, further comprising:
- the edge throughput services management system to monitor current conditions for the managed client information handling system data bandwidth usage of the wireless network access; and
- the edge throughput services management system to identify potential data bandwidth bottlenecks in accordance with historical network data bandwidth usage of all personas and previous data bandwidth bottlenecks and to adjust to data bandwidth made available to a first managed client information handling system of the plurality of managed client information handling systems.

20. The edge device information handling system of claim 19, further comprising:
the edge throughput services management system to determine best routing through a wireless network core and to request for additional network slices to adjust data bandwidth and to avoid a potential data bandwidth bottleneck.

* * * * *